(12) United States Patent
Chan (10) Patent No.: US 6,229,845 B1
(45) Date of Patent: May 8, 2001

(54) BUS DRIVER WITH DATA DEPENDENT DRIVE STRENGTH CONTROL LOGIC

(75) Inventor: Ting-Li Chan, Laguna Niguel, CA (US)

(73) Assignee: QLogic Corporation, Aliso Viejo, CA (US)

( * ) Notice: Subject to any disclaimer, the term of this patent is extended or adjusted under 35 U.S.C. 154(b) by 0 days.

(21) Appl. No.: 09/257,803

(22) Filed: Feb. 25, 1999

(51) Int. Cl.⁷ ...................................................... H04B 1/38
(52) U.S. Cl. .............................................. 375/219; 375/789
(58) Field of Search ...................................... 375/219, 220, 375/222, 286, 289, 295; 326/60, 90, 93, 96, 99, 82, 86; 327/100, 108

(56) References Cited

U.S. PATENT DOCUMENTS

| | | | |
|---|---|---|---|
| 3,771,038 | 11/1973 | Rubis | 318/636 |
| 3,775,692 | 11/1973 | Azegami | 328/151 |
| 3,938,008 | 2/1976 | Knepper et al. | 317/31 |
| 4,463,272 | 7/1984 | Tucker | 307/358 |
| 4,480,231 | 10/1984 | Takehara | 330/261 |
| 4,709,167 | 11/1987 | Brokaw | 307/443 |
| 4,962,328 | 10/1990 | Wöss et al. | 307/491 |
| 5,179,379 | 1/1993 | Allen et al. | 341/118 |
| 5,276,367 | 1/1994 | Shibatani et al. | 307/494 |
| 5,306,965 * | 4/1994 | Asprey | 326/83 |
| 5,323,460 * | 6/1994 | Warner et al. | 379/399 |
| 5,493,246 | 2/1996 | Anderson | 327/382 |
| 5,636,165 * | 6/1997 | Amatangelo et al. | 365/194 |
| 5,666,354 * | 9/1997 | Cecchi et al. | 370/284 |
| 5,673,130 * | 9/1997 | Sundstrom et al. | 359/158 |
| 5,687,330 * | 11/1997 | Gist et al. | 710/129 |
| 5,691,655 | 11/1997 | Geisler | 326/86 |
| 5,731,715 * | 3/1998 | Mote, Jr. | 326/93 |
| 5,736,885 | 4/1998 | Wietecha et al. | 327/307 |
| 5,748,675 * | 5/1998 | Hormel et al. | 375/257 |
| 5,812,595 * | 9/1998 | Jandu | 375/219 |
| 5,862,180 * | 1/1999 | Heinz | 375/244 |
| 5,864,253 * | 1/1999 | Katakura et al. | 327/297 |
| 6,057,711 * | 5/2000 | Sessions | 326/93 |

OTHER PUBLICATIONS

SCSI·Fibre Channel·IDE Designers' Guide, QLogic Product Catalog, 1997.

* cited by examiner

*Primary Examiner*—Chi Pham
*Assistant Examiner*—Emmanuel Bayard
(74) *Attorney, Agent, or Firm*—Knobbe, Martens, Olson & Bear, LLP

(57) ABSTRACT

A transceiver circuit for transmitting a data signal over a communications bus at a predefined bit rate includes a transmitter. The data signal is a digital signal having first and second logic levels. The transmitter receives and modifies the data signal and feeds the modified data signal to the communications bus. The transmitter includes a drive circuit and an output circuit. The drive circuit receives the data signal and a clock signal and generates control signals which depend on the logic level of the data signal. The control signals are sequentially generated when the data signal has consecutive bits of the same logic level. The output circuit receives the control signals and the data signal and generates an output signal which corresponds to the data signal, but which has a varying drive strength determined by the control signals.

23 Claims, 7 Drawing Sheets

BUS DRIVER WITH DATA DEPENDENT DRIVE STRENGTH CONTROL LOGIC

BACKGROUND OF THE INVENTION

1. Field of the Invention

The invention relates to a system wherein system components communicate via a communications bus. More particularly, the invention relates to bus interface modules for a computer systems.

2. Description of the Related Art

An exemplary communications system comprises a central processing unit and external functional modules within a computer which communicate via an internal communications bus. Another example is a communications system comprising at least two computers which communicate via an external communications bus. Each computer forms with one or more peripheral devices an individual communications system wherein communication occurs via communications buses. The peripheral devices can include, for example, external or internal disk drives, printers, scanners or data communications devices.

The computer and the peripheral devices communicate via a communications bus. The communications bus is a set of conductors connecting various functional units within a computer and connecting peripheral devices to the computer. The conductors usually extend parallel to each other in a cable, or across a substrate. The substrate is, for example, a semiconductor or a printed circuit board (PCB). The conductors are isolated from each other and are isolated from an electrically conducting substrate by a dielectric material. The thickness of the dielectric material contributes to a capacitance between a conductor and the support, and a capacitance between two adjacent conductors. These capacitances are referred to as parasitic capacitances and generally have negative influences on the transmission characteristics of the bus. The parasitic capacitances induce a propagation delay of signals travelling along the bus, and induce crosstalk between the conductors.

One example of a communications bus is a bus in accordance with a Small Computer System Interface (SCSI) standard. SCSI-II has been standardized as ANSI STD. The SCSI standard is a processor-independent standard for system-level interfacing between a computer and intelligent devices, including hard disks, floppy disks, CD-ROM, printers, scanners and many more. With the SCSI standard, up to fifteen devices can be connected to a single controller (or "host adapter") on the computer's bus. The SCSI standard allows sixteen bits to be transferred in parallel (eight-bit bus) and can operate in either asynchronous or synchronous modes. The synchronous transfer rate is up to 60 Mbit/s. SCSI connections normally use "single-ended" drivers as opposed to differential drivers. Single-ended SCSI connections can support up to six meters of cable. Differential SCSI connections can support up to 25 meters of cable. Further details of the SCSI bus are described in a book entitled "SCSI Understanding the Small Computer System Interface," PTR Prentice Hall, Englewood Cliffs, N.J. 07632, ISBN 0-13-796855-8.

Each computer and the peripheral devices comprise interface modules which, inter alia, organize communications between the computers and between a computer and its peripheral devices in accordance with a defined communications protocol.

The interface modules include a transceiver which has a receiver and a transmitter (bus driver) to allow bidirectional data transmission. For differential transmission, two lines, referred to as "noninverted" and "inverted" or as "positive" and "negative", are used to differentiate actual signal from noise. The bus driver of the transceiver includes a transmit amplifier to amplify a digital signal, and the receiver includes a receive amplifier to amplify the received digital signal.

In many applications, a digital signal is RUN-length encoded before it is fed to the bus driver so that the maximum number of consecutive logic "HIGH's" or "LOW's" are limited. However, applications using SCSI do not allow such an encoding of the digital signal. In these applications, the unconditioned data is fed to the bus. Thus, a data line on a SCSI bus may not change for an extended time duration. Under normal conditions, the combination of the parasitic capacitances and the limitation that the digital signal should not be encoded can cause saturation of the receiver. Saturation slows the receiver response so that the timing of the output response is not predictable.

SUMMARY OF THE INVENTION

There is therefore a need to improve data transmission over a communications bus in accordance with SCSI so that saturation of the receiver is avoided.

An aspect of the invention is a transceiver circuit for transmitting a data signal over a communications bus at a predefined bit rate. The data signal is a digital signal having first and second logic levels. The transceiver includes a transmitter which receives and modifies the data signal and feeds the modified data signal to the communications bus. The transmitter includes a drive circuit and an output circuit. The drive circuit receives the data signal and a clock (time reference) signal and generates control signals which depend on the logic level of the data signal. The control signals are serially generated when the data signal has consecutive bits of the same logic level. The output circuit receives the control signals and the data signal and generates an output signal which corresponds to the data signal, but which has a varying drive strength determined by the control signals.

A further aspect of the invention involves a bus driver interface module for transmitting a data signal having first and second logic levels over a communications bus at a predefined bit rate. The bus driver interface module includes a transmitter configured to receive and modify the data signal and to feed the modified data signal to the communications bus. The transmitter includes a drive circuit and an output circuit. The drive circuit receives the data signal and a clock signal and generates control signals which depend on the logic level of the data signal. The control signals are sequentially generated when the data signal has consecutive bits of the same logic level. The output circuit receives the control signals and the data signal, and generates an output signal which corresponds to the data signal, but has a varying drive strength determined by the control signals.

An additional aspect of the invention involves a circuit for transmitting a data signal. The circuit includes a drive circuit and an output circuit. The drive circuit receives a data signal having first and second logic levels, and generates control signals which depend on the logic level of the data signal. The control signals are sequentially generated when the data signal has consecutive bits of the same logic level. The output circuit receives the control signals and the data signal, and generates an output signal which corresponds to the data signal, but has a varying drive strength determined by the control signals.

Another aspect of the invention involves a method for driving a communications bus with a drive strength which is dependent from a data signal. The data signal has first and second logic levels. The data signal is fed to a drive circuit, and control signals are sequentially generated when the data signal has consecutive bits of the same logic level. The data signal and the sequentially generated control signals are fed to an output circuit which generates an output signal which corresponds to the data signal, and which has a drive strength which is determined by the sequentially generated control signals.

In one embodiment, a first control signal is generated when the data signal has two consecutive bits of the same logic level, and a second control signal is generated when the data signal has three consecutive bits of the same logic level. A third control signal is generated when the data signal has four consecutive bits of the same logic level. Following a change of a logic level of the data signal, the communications bus is driven with a maximal drive strength. The drive strength is sequentially reduced by means of the control signals when the data signal has consecutive bits of the same logic level.

BRIEF DESCRIPTION OF THE DRAWINGS

The foregoing features and other features of the present invention will now be described with reference to the drawings of a preferred embodiment of a bus driver. In the drawings, the same components have the same reference numerals. The illustrated embodiment is intended to illustrate, but not to limit the invention. In the drawings.

DETAILED DESCRIPTION OF THE PREFERRED EMBODIMENT

Figures 1, 4:
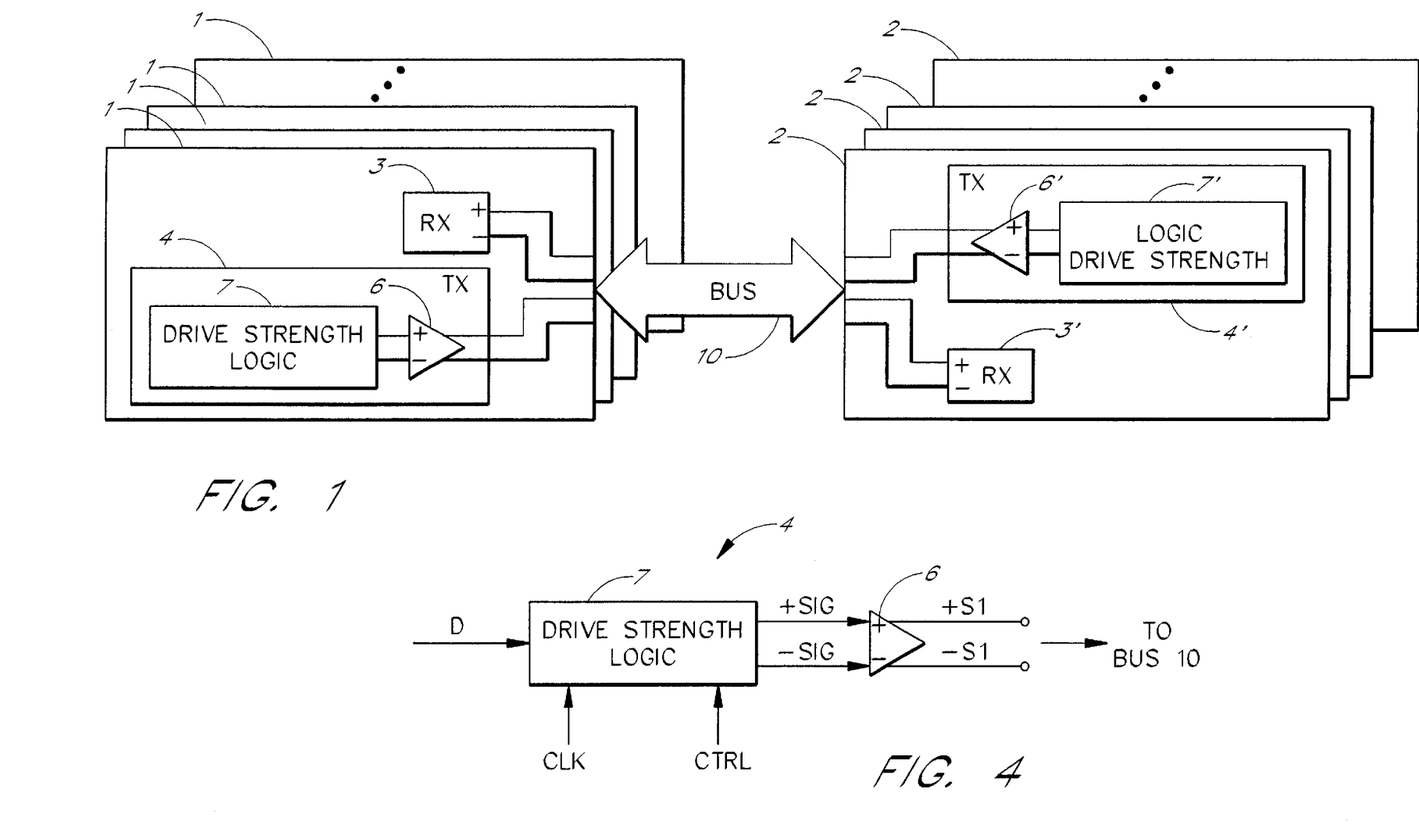
FIG. 1 shows a schematic block diagram of an exemplary communications system.
FIG. 4 shows a digital signal without a zero-crossing offset.

FIG. 1 shows a simplified block diagram of an exemplary communications system comprising two system components 1, 2 which are interconnected through a communications bus 10. Hereinafter, the communications bus 10 is generally referred to as the bus 10. The system component 1 can be considered as a computer to which a peripheral device as the system component 2 is connected via the bus 10. As indicated in FIG. 1, several system components 1 and several peripheral devices 2 can be connected to the bus 10. The peripheral device 2 may be an external disk drive, a printer, a scanner, a data communications device or any other device which can be connected to the computer 1. Although not shown in FIG. 1, it is contemplated that more than one peripheral device can be connected to the computer 1 via the bus 10.

In an alternative embodiment, the system component 2 is the computer and the system component 1 is the peripheral device. Further, the system component 1 (or 2) can be a central processing unit (CPU) which is connected to internal functional modules such as memories and a hard disc. The CPU and the hard disc communicate via an internal bus. The internal bus can be implemented as a cable bus or as a bus on a printed circuit board (PCB).

Hereinafter, an exemplary embodiment of the present invention is described with reference to a communications system comprising the computer 1 and the single peripheral device 2, which are connected via the bus 10. The computer 1 and the peripheral device 2 communicate via the bus 10 which, for example, is a bus in accordance with the Small Computer System Interface (SCSI) standard. Those skilled in the art will appreciate that the bus 10 can be configured in accordance with other specifications or standards for enabling communications between the system components 1, 2.

The SCSI specification defines a bus that is made up of 54 lines and supports bidirectional data transmission in two electrical specifications, single-ended and low-voltage differential. The single-ended version uses a single line for each signal, referenced to a common ground. The differential version uses a pair of lines, sometimes referred to as "noninverting" and "inverting" and sometimes referred to as "positive" and "negative" and labeled as "+"and "−," respectively, to differentiate actual signals from noise. In the differential version, each signal driver has two outputs and each signal receiver has two inputs.

The computer 1 and the peripheral device 2 comprise (bus driver) interface modules which, inter alia, organize, monitor and control communications between the computer 1 and the peripheral device 2 in accordance with a communications protocol. The communications protocol encompasses functions which relate to timing, controlling, formatting and representing data of the data transmission. The interface modules each include transceivers which terminate the bus 10 within the computer 1 and the peripheral device 2.

The transceivers of the computer 1 and the peripheral device 1, 2 are substantially identical so that hereinafter only a single transceiver of the computer 1 is described. The transceiver includes a receiver 3 and a transmitter 4. The transmitter 4 is hereinafter referred to as bus driver. The bus driver 4 includes an amplifier 6 and a drive strength circuit 7. Components of the transceiver in the peripheral device 2 are, therefore, referenced with (primed) reference numerals 3', 4', 6', 7'.

In one embodiment, the bus driver 4 is configured to convey a digital signal in the differential mode. The digital signal has a predetermined bit rate, wherein each bit of the digital signal is represented through a logic level "HIGH" or a logic level "LOW". The logic levels HIGH and LOW have different voltages, for instance, a voltage in a range between 0.6 and 1.9 volts (V) is assigned to the logic level HIGH and a voltage in a range between −0.6 and −11.9 V is assigned to the logic level LOW. When a transition from a level HIGH to a level LOW occurs, the positive signal and the negative signal ideally cross at 0 volt.

In communications systems other than systems applying the SCSI standard, the digital signal is often conditioned (i.e., coded) before it is input to the bus driver 4 so that logic HIGHs are as likely as logic LOWs. However, systems applying the SCSI standard do not allow such a conditioning of the digital signal. In these (SCSI) systems, the unconditioned data is fed to the bus 10. Thus, it is more likely that the digital signal comprises several consecutive logic HIGHs or logic LOWs. When several consecutive logic HIGHs or LOWs occur, the same voltage is maintained over a period of several bits without any transitions.

Figure 2:
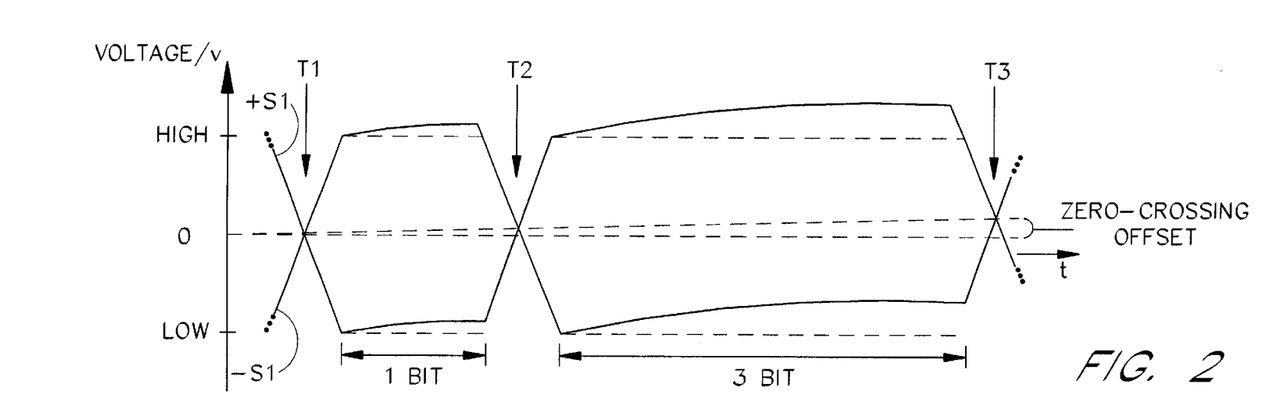
FIG. 2 shows a schematic block diagram of a bus driver.

FIG. 2 shows a section of an exemplary digital signal as a function of the time t. The section includes a period of about 4 bits during which three transitions T1, T2, T3 occur. The digital signal is a differential signal having a positive (noninverted) signal +S1 and a negative (inverted) signal −S1. At the first transition T1, the signal +S1 changes from logic HIGH to logic LOW, and the signal −S1 changes from logic LOW to logic HIGH. Both signals cross each other at 0 volt which is referred to as the zero crossing. During the duration of a bit, the signals +S1, −S1 ideally remain at the fixed voltages of, for example, +1.2 volts and −1.2 volts, respectively. However, because of the parasitic capacitances of the bus 10, as explained above, the bus 10 is charged. In the illustrated section of the digital signal, the bus 10 is charged in positive direction. It is contemplated that bus 10 can equally be charged in negative direction. The direction depends on the present charge status of the bus 10.

Because of the charging of the bus 10 in positive direction, at the end of the first bit the voltage of the logic HIGH has increased to a slightly higher (more positive) value, and the voltage for the logic LOW has decreased to a slightly lower (less negative) value. When the second transition T2 occurs, the signal +S1 returns to the logic HIGH and the signal −S1 returns to the logic LOW. However, because the voltages for the signals +S1, −S1 have drifted, the crossing of the signals +S1, S2 does not occur at 0 volts, but occurs at a slightly higher voltage. This voltage is referred to as zero-crossing offset. Typically, a small zero-crossing offset is averaged out when transitions occur regularly. As shown in FIG. 2, the transitions T1, T2, T3 do not occur regularly. Three consecutive bits of the same logic level occur after the transition T2. During this period of three bits, the bus 10 is charged over a period of three bits and the voltages of the logic HIGH and LOW drift "upwards." In this case, the zero-crossing is substantially higher than after only one bit. As described above, the signals +S1, −S1 travel along the bus 10 to the receiver 3' of the peripheral device 2. The receiver 3' includes a differential amplifier as an input stage. The differential amplifier is connected to a supply voltage which determines upper and lower rail voltages. As long as the signals +S1, −S1 input to the differential amplifier have voltages which are within the range defined by the upper and lower rail voltages, the differential amplifier operates in a linear range. That is, a signal output from the differential amplifier is proportional to its input signal.

In FIG. 2, the charging of the bus 10 during the period of three bits causes the signal −S1 to drift upwards, and the zero-crossing offset increases. During these three bits, for example, during the last bit, it may occur that the voltage of the signal −S1 exceeds the upper rail voltage of the differential input amplifier. When the signal −S1 exceeds the upper rail voltage, the differential input amplifier becomes saturated. In saturation, the differential input amplifier slowly responds to the incoming signal and may not output valid data and data may be lost. A loss of data, however, is undesired because it limits the possible transfer speed and requires the data to be transmitted again.

Figure 3:
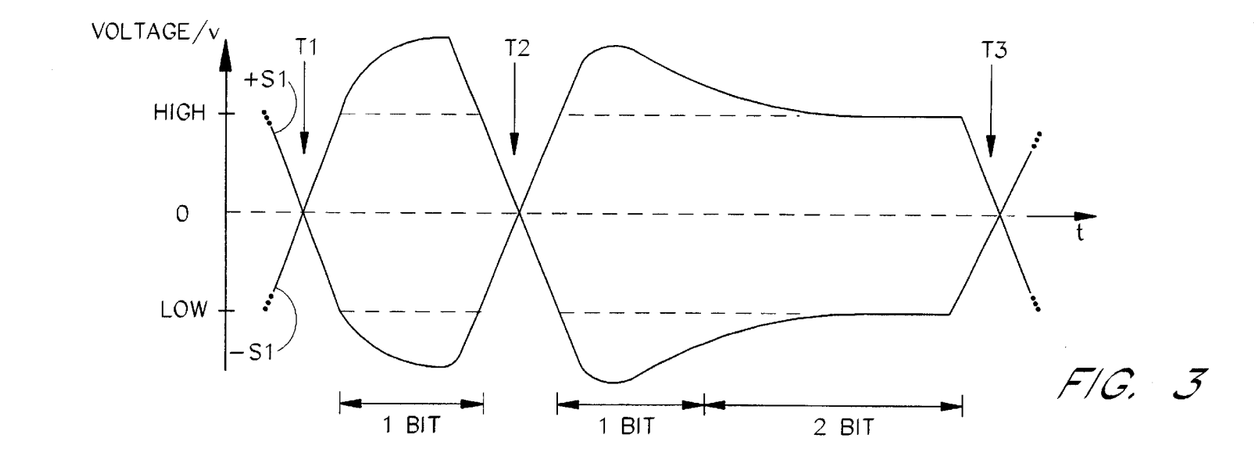
FIG. 3 shows a digital signal having a zero-crossing offset.

FIG. 3 corresponds to FIG. 2 and shows the four bits and the three transitions T1, T2, T3 of the signals +S1, −S1. FIG. 3, however, shows the signals +S1, −S1 generated by a bus driver 4 in accordance with the present invention. The bus driver 4 is configured to counteract any drift of the signals +S1, −S1 as explained below. After the transitions T1, T2, the bus driver 4 increases a drive current (drive strength) and the signals +S1, −S1 have increased voltages after the transitions T1, T2. For instance, after the transition T2, the drive strength is increased, but within a period of about 2–3 bits, the voltages return to their steady state values.

In one embodiment, the bus driver 4 generates a first control signal when a data signal has two consecutive bits of the same logic level, and a second control signal when the data signal has three consecutive bits of the same logic level. The bus driver 4 generates a third control signal when the data signal has four consecutive bits of the same logic level. Following a change of a logic level of the data signal (T1, T2), the bus 10 is driven with a maximal drive strength. The drive strength is sequentially reduced by means of the control signal when the data signal has consecutive bits of the same logic level.

It is contemplated that the bus driver 4 can be configured to generate more than three control signals. This may be desirable when the data signal is expected to have more than four consecutive bits of the same logic level.

FIG. 4 shows an embodiment of the bus driver 4. The bus driver 4 includes a drive strength circuit 7 and a differential amplifier 6. The drive strength circuit 7 is configured to receive a data signal D, a clock signal CLK and a control signal CTRL. The drive strength circuit 7 converts the data signal D to differential signals +SIG, −SIG which are input to the differential amplifier 6. The differential amplifier 6 amplifies these signals +SIG, −SIG and outputs the signals +S1, −S1 which are fed to the bus 10.

Figure 5:
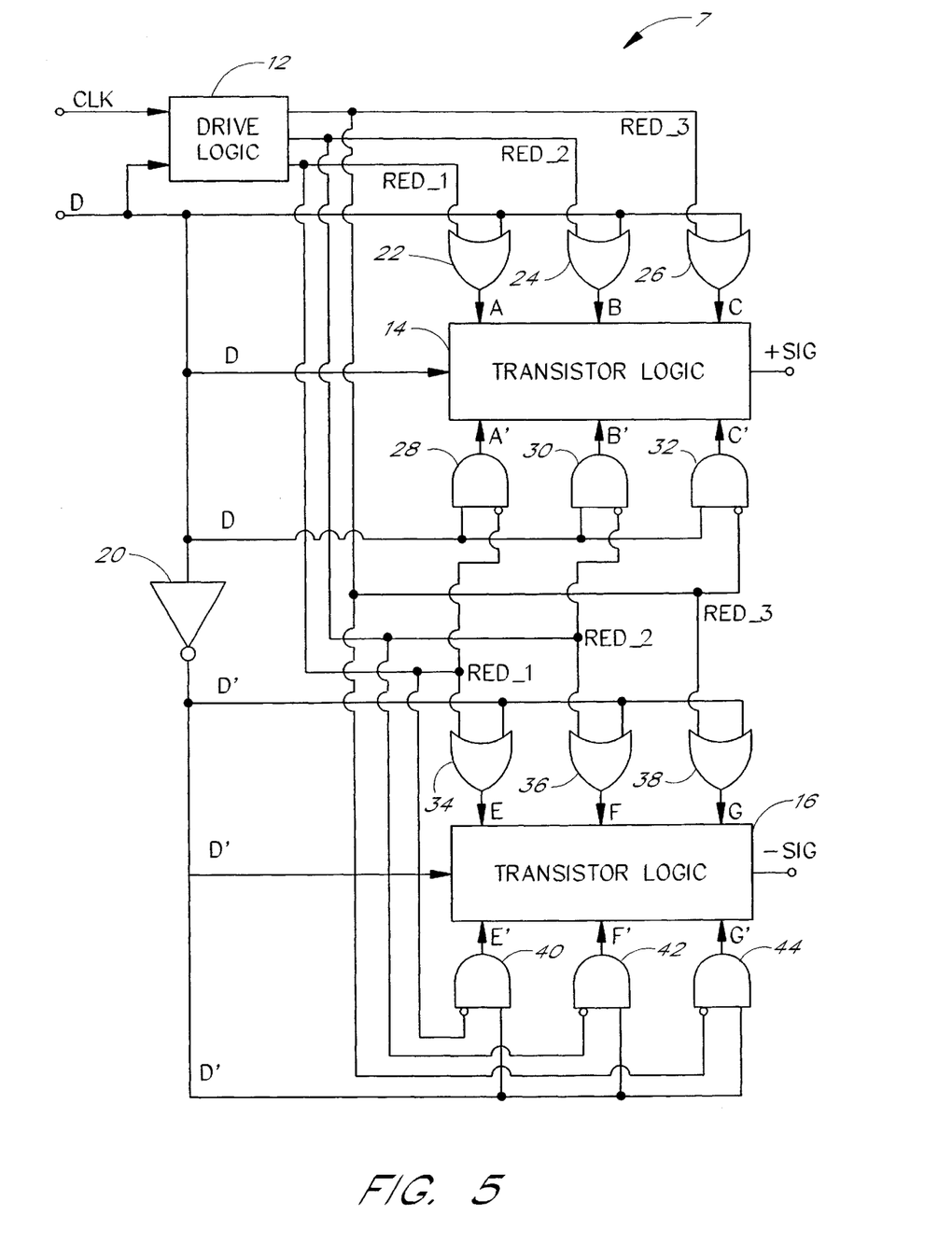
FIG. 5 shows a schematic embodiment of a drive strength logic.
Figure 6:
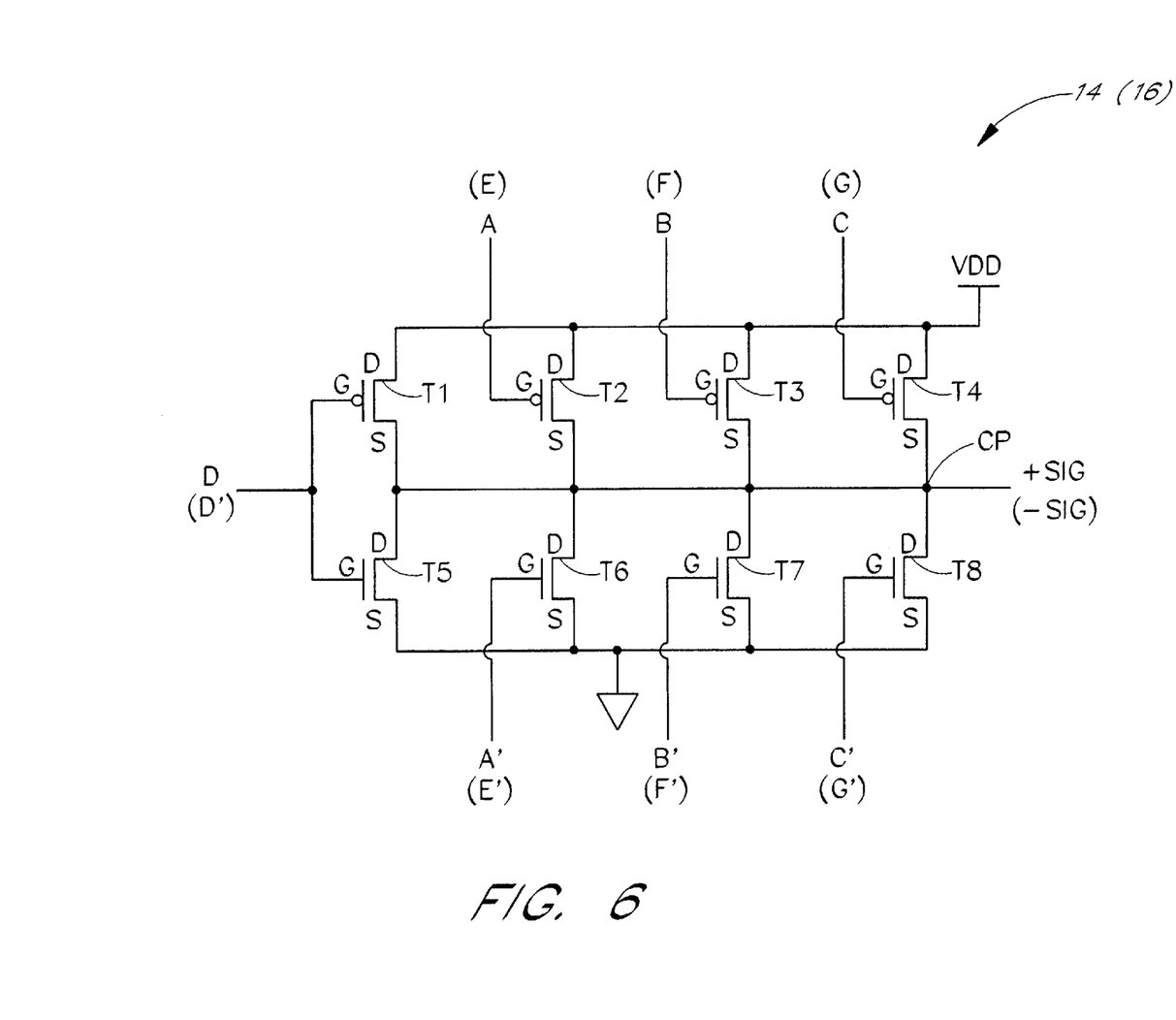
FIG. 6 shows an embodiment of the transistor circuitry included in the drive strength logic shown in FIG. 5.
Figure 7:
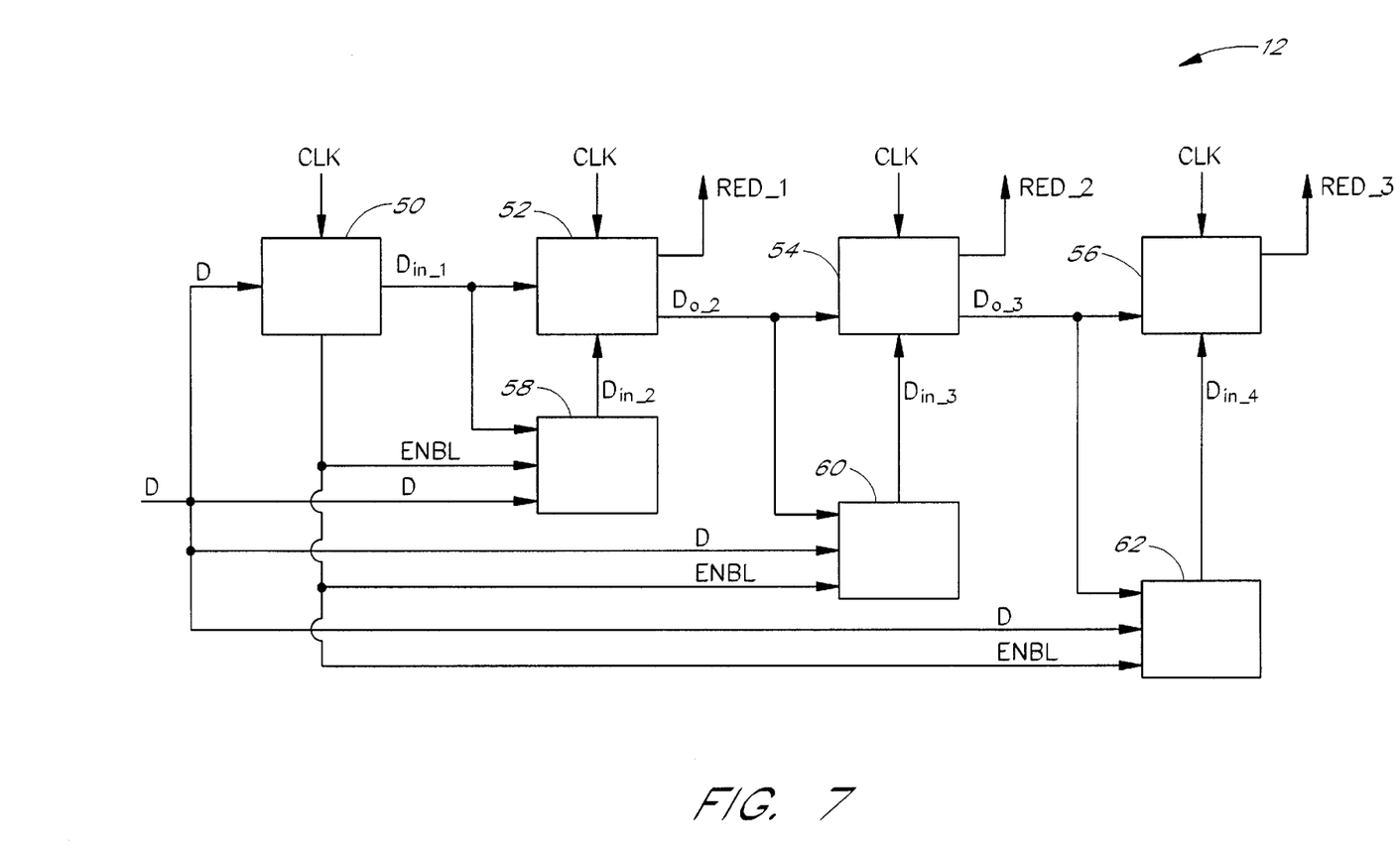
FIG. 7 shows an embodiment of a drive circuit included in the drive strength logic shown in FIG. 5.

FIG. 5 shows a schematic embodiment of the drive strength circuit 7. The drive strength circuit 7 includes a drive circuit 12, a transistor circuit 14 which outputs the signal +SIG, and a transistor circuit 16 which outputs the signal −SIG. The transistor circuits 14, 16 form an output circuit of the drive strength circuit 7. The drive circuit 12 and the transistor circuits 14, 16 are interconnected through a network including an inverter 20 and logic gates such as OR gates and AND gates. FIGS. 6, 7 show details of the transistor circuits 14, 16 and the drive circuit 12, respectively.

The drive circuit 12 receives the clock signal CLK and the data signal D and outputs three signals RED_1, RED_2, RED_3 (" RED" is short for "reduce".) Three OR gates 22, 24, 26 are interconnected between the drive circuit 12 and the transistor circuit 14. The OR gate 22 receives the signal RED_1 and the data signal D and outputs a signal A which is input to the transistor circuit 14. The OR gate 24 receives the signal RED_2 and the data signal D and outputs a signal B which is input to the transistor circuit 14. The OR gate 26 receives the signal RED_3 and the data signal D and outputs a signal C which is input to the transistor circuit 14. Additionally, the transistor circuit 14 receives the data signal D.

Further, three AND gates 28, 30, 32 are connected to the transistor circuit 14. In the illustrated embodiment, each AND gate 28, 30, 32 has one inverting input. The AND gate 28 receives the data signal D at the noninverting input and receives the signal RED_1 at the inverting input. The AND gate 28 outputs a signal A'. The AND gate 30 receives the data signal D at the noninverting input and receives the signal RED_2 at the inverting input. The AND gate 30 outputs a signal B'. The AND gate 32 receives the data signal D' at the noninverting input and receives the signal RED_3 at the inverting input. The AND gate 32 outputs a signal C'.

The transistor circuit 16 is connected similarly. An inverter 20 is connected to provide an inverted data signal D' to the transistor circuit 16. Three OR gates 34, 36, 38 are interconnected between the drive circuit 12 and the transistor circuit 16. The OR gate 34 receives the signal RED_1 and the inverted data signal D'. The OR gate 34 outputs a signal E which is input to the transistor circuit 16. The OR gate 36 receives the signal RED_2 and the inverted data signal D'. The OR gate 36 outputs a signal F which is input to the transistor circuit 16. The OR gate 38 receives the signal RED_3 and the inverted data signal D'. The OR gate 38 outputs a signal G which is input to the transistor circuit 16. Additionally, the transistor circuit 16 receives the inverted data signal D'.

Further, three AND gates 40, 42, 44 are connected to the transistor circuit 16, each having one inverting input. The AND gate 40 receives the data signal D' at the noninverting input and receives the signal RED_1 at the inverting input. The AND gate 40 outputs a signal E'. The AND gate 42 receives the data signal D' at the noninverting input and receives the signal RED_2 at the inverting input. The AND gate 42 outputs a signal F'. The AND gate 44 receives the data signal D' at the noninverting input and receives the signal RED_3 at the inverting input. The AND gate 44 outputs a signal G'.

The transistor circuits 14, 16 receive the data signals D, D', respectively, as input signals. The control signals RED_1, RED_2, RED_3 and the data signals D, D' enable the transistor circuits 14, 16, respectively, only when consecutive bits of the same logic level are to be transmitted. For example, the signal A is only LOW when the data signal D and the control signal RED_1 are "LOW". In all other cases, the signal A is HIGH. Correspondingly, the signal A' is only HIGH when the inverted data signal D' is HIGH and the control signal RED_1 is low. In all other cases, the signal A' is LOW.

In the illustrated embodiment of the drive strength circuit 7, the drive circuit 12 activates (switches HIGH) the control signals RED_1, RED_2, RED_3 sequentially, but deactivates (switches LOW) the control signals RED_1, RED_2, RED_3 simultaneously as shown in FIG. 9. Thus, the signals A, B, C are activated sequentially and deactivated simultaneously. The remaining signals A'–C', E–G, E'–G' are generated correspondingly.

FIG. 6 shows an exemplary embodiment of the transistor circuit 14 included in the drive strength logic shown in FIG. 5. It is contemplated that the transistor circuit 14 has a structure which is equal to a structure of the transistor circuit 16. In FIG. 6, therefore, signals which are input and output from the transistor circuit 16 are shown between parentheses. The transistor circuit 14 includes p-channel transistors T1, T2, T3, T4 and n-channel transistors T5, T6, T7, T8 which are arranged in four parallel branches. While specific n-channel and p-channel transistors are used in the illustrated embodiment, it is contemplated that the transistor circuit 14 could be implemented by completely reversing the structure or by using other transistors.

Each branch of the transistor circuit 14 includes a p-channel transistor T1–T4 (hereinafter "transistor") and an n-channel transistor T5–T8 (hereinafter "transistor") and is connected to a supply voltage VDD and to ground. Each transistor T1–T8 has three terminals, comprising a gate G, a drain D and a source S. A p-channel transistor T1–T4 is active when the voltage applied to the respective gate G is low ("active low"), and an n-channel transistor T5–T8 is active when the voltage applied to the gate G is high ("active high"). The sources S of the transistors T1–T4 and the drains D of the transistors T5–T8 are interconnected and form an output CP for the signal +SIG. The drains D of the transistors T1–T4 are connected to the supply voltage VDD, and the sources S of the transistors T5–T8 are connected to ground.

The gates G of the transistors T1, T5 are serially connected between the supply voltage VDD and ground. The gates G of the transistors T1, T5 are connected to receive the data signal D. Within the branch comprising the transistors T2, T6, the gate G of the transistor T2 receives the signal A and the gate G of the transistor T6 receives the signal A'. Within the branch comprising the transistors T3, T7, the gate G of the transistor T3 receives the signal B and the gate G of the transistor T7 receives the signal B'. Within the branch comprising the transistors T4, T8, the gate G of the transistor T4 receives the signal C and the gate G of the transistor T8 receives the signal C'.

The transistors T1, T5 control the signal +SIG to have at least a bias value which is independent from the signals RED_1, RED_2, RED_3. The (active low) transistors T2–T4 conduct when the signals RED_1, RED_2, RED_3, respectively, are LOW and the data line D is low. The (active high) transistors T6–T8 conduct when the signals RED_1, RED_2, RED_3, respectively, are LOW and the data line D is HIGH.

In case a first bit of the data signal D is HIGH, the transistor T1 does not conduct and the transistor T5 has a predefined conductivity between the drain D and the source S, and, thus, between the output CP and ground. At the same time the signals RED_1, RED_2, RED_3 are LOW and the signals A, B and C are HIGH because the data signal D (HIGH) determines under these circumstances the output of the OR gates 22, 24, 26. The (active low) transistors T2–T4 do not conduct. The signals A', B', C' are HIGH because the (negated) data signal D' determines under these circumstances the output of the AND gates 28, 30, 32. The (active high) transistors T6–T8 are conducting.

The transistors T5–T8 and, thus, their respective conductive paths are parallel with respect to the output CP and ground. It is well known that in a parallel connection of resistors the value of the total resistance is less than the lowest value of the individual resistors. Under these conditions, the total resistance between the output CP and ground has the lowest possible value. Thus, the total conductivity is at a maximum, and consequently the sink current from the output CP to ground has a maximal value. This maximal value of the sink current can be varied by the control signals RED_1, RED_2, RED_3. As soon as, for example, the control signal RED_1 is HIGH the inputs of the AND gate 28 are HIGH and the signal A' is LOW. The low signal A' deactivates the (active high) transistor T6 whereby the total resistance between the output CP and ground increases and the conductivity therefore decreases. Thus, the sink current decreases. Similarly, when the control signals RED_2, RED_3 successively become HIGH the total resistance further increases and the sink current further decreases.

When the data signal D is LOW, the transistor T5 does not conduct and the transistor T1 has a predefined conductivity between the drain D and the source S, and, thus, between the supply voltage and the output CP. At the same time the signals RED_1, RED_2, RED_3 are LOW and the signals A, B, C are LOW because the data signal D (LOW) determines the output of the OR gates 22, 24, 26. The (active low) transistors T2–T4 conduct. As described above, the total resistance of the transistors T1–T4 is lowest as long as the signals RED_1, RED_2, RED_3 are LOW. The low resistance provides a relatively high drive current for the signal +SIG. As soon as, for example, the signal RED_1 goes HIGH, the transistor T2 is deactivated and the impedance increases and the drive current decreases. The drive current decreases sequentially as the signals RED_2, RED_3 go HIGH in a sequential manner.

The illustrated drive strength circuit 7 causes the signal +SIG to be initially driven to a desired voltage or current level by turning on a plurality of drive transistors at the same time to assure the desired level is obtained in a short amount of time. Thereafter, if the data signal D remains at the same logic level for an extended duration (e.g., several bits), the drive transistors are deactivated in sequence to reduce the drive capability of the device (e.g., decrease the conductivity) so that the signal +SIG remains within predetermined boundaries avoiding saturation of the receiver amplifier.

Figure 8:
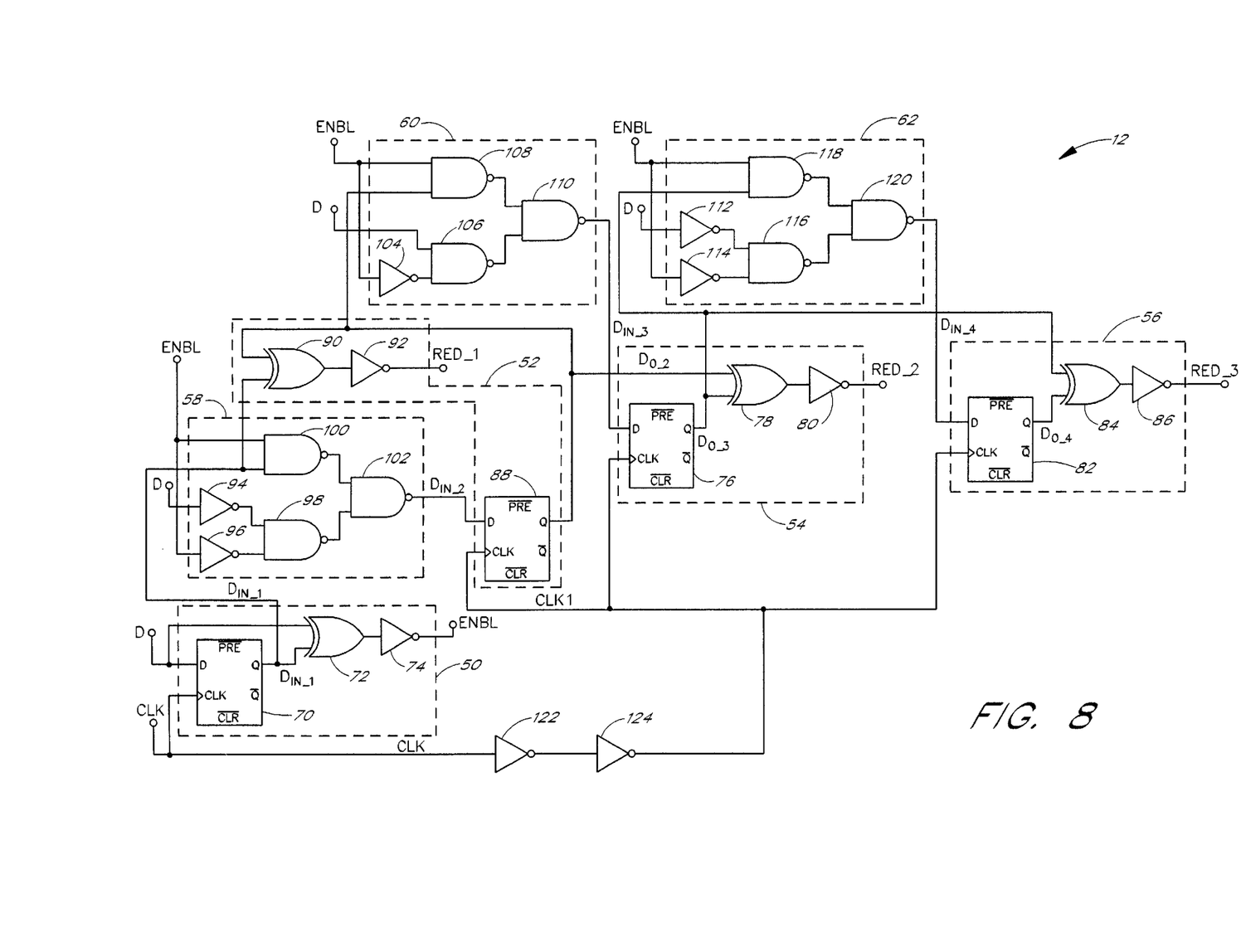
FIG. 8 shows the drive circuit with exemplary embodiments of subcircuits.

FIG. 7 shows an exemplary embodiment of the drive circuit 12 included in the drive strength logic shown in FIG. 5. The drive circuit 12 receives the clock signal CLK and the data signal D and generates the signals RED_1, RED_2, RED_3 which are output from the drive circuit 12. The drive circuit 12 includes subcircuits 52, 54, 56, which output the signals RED_1, RED_2, RED_3, and subcircuits 50, 58, 60, 62, which generate signals used by the subcircuits 52, 54, 56. Exemplary embodiments of the subcircuits 50–62 are shown in FIG. 8.

The subcircuit 50 receives the clock signal CLK and the data signal D. The subcircuit 50 generates a signal Din_1 for the subcircuits 52, 58 and an enable signal ENBL for the subcircuits 58, 60, 62. The subcircuit 58 receives the signal Din_1, the data signal D and the enable signal ENBL. The subcircuit 58 generates a signal Din_2 for the subcircuit 52.

The subcircuit 52 receives the clock signal CLK and the signals Din_1, Din_2. The subcircuit 52 generates the signal RED_1 and a signal Do_2 for the subcircuits 54, 60. The subcircuit 60 receives the signal Do_2, the data signal D and the enable signal ENBL. The subcircuit 60 generates a signal Din_3 for the subcircuit 54.

The subcircuit 54 receives the clock signal CLK and the signals Do_2, Din_3. The subcircuit 54 generates the signal RED_2 and a signal Do_3 for the subcircuits 56, 62. The subcircuit 62 receives the signal Do_3, the data signal D and the enable signal ENBL. The subcircuit 62 generates a signal Din_4 for the subcircuit 56. The subcircuit 56 receives the clock signal CLK and the signals Do_3, Din_4. The subcircuit 56 generates the signal RED_3.

In one embodiment of the drive circuit 12, the clock signal CLK input to the subcircuits 52, 54, 56 can be delayed with respect to the clock signal CLK input to the subcircuit 50. The delay can be achieved, for example, by two serially connected inverters, as shown in FIG. 8.

FIG. 8 shows the drive circuit 12 with exemplary embodiments of the subcircuits 50–62. The subcircuit 50 includes a flip-flop 70 (for example, a D-flip-flop 74LS74 available from Texas Instruments or the like), an exclusive-OR (XOR) gate 72 and an inverter 74. The data (D) input of the flip-flop 70 receives the data signal D. The flip-flop 70 is clocked by the clock signal CLK. An output Q of the flip-flop 70 provides the signal Din_1 which is derived from the data signal D. The data signal D and the signal Din_1 are provided as inputs to the XOR gate 72. An output of the XOR gate 72 is connected to the inverter 74 which outputs the enable signal ENBL.

The subcircuits 54, 56 have structures which are substantially similar to the structure of the subcircuit 50 and include respective flip-flops 76, 82, XOR gates 78, 84 and inverters 80, 86. The flip-flop 76 in the subcircuit 54 receives the signal Din_3 and a clock signal CLK1 which is slightly delayed with respect to the clock signal CLK. The delay is achieved by two inverters 122, 124 connected in series. The flip-flop 76 outputs the signal Do_3 and the inverter 80 outputs the signal RED_2. Correspondingly, the flip-flop 82 receives the signal Din_4 and the clock signal CLK1 and outputs the signal Do_4. The inverter 86 outputs the signal RED_3.

The subcircuit 58 includes inverters 94, 96 and NAND gates 98, 100, 102. The inverter 94 receives the data signal D and provides an inverted output to a first input of the NAND gate 98. The inverter 96 receives the enable signal ENBL from the subcircuit 50 and provides an inverted output to a second input of the NAND gate 98. An output of the NAND gate 98 is connected to a first input of the NAND gate 102. A second input of the NAND gate 102 is connected to an output of the AND gate 100. The AND gate 100 receives the signal Din_1 and the enable signal ENBL as its inputs.

The subcircuit 62 has a structure that is substantially similar to the structure of the subcircuit 58, but includes inverters 112, 114 and NAND gates 116, 118, 120. The subcircuit 62 receives the data signal D, the enable signal ENBL and the signal Do_3. The subcircuit 62 outputs the signal Din_4.

The subcircuit 52 includes a flip-flop 88, for example, a D-flip-flop 74LS74, an XOR gate 90 and an inverter 92. The flip-flop 88 receives the signal Din_2 and is clocked by the clock signal CLK1. An output Q of the flip-flop 88 provides the signal Do_2, which is input to a first input of the XOR gate 90 and fed to the subcircuits 54, 60. A second input of the XOR gate 90 receives the signal Din_1. An output of the XOR gate 90 is connected to the input of the inverter 92. The output of the inverter 92 is the signal RED_.

The subcircuit 60 includes an inverter 104 and AND gates 106, 108, 110. The input of the inverter 104 receives the enable signal ENBL. The output of the inverter 104 is connected to a first input of the NAND gate 106. A second input of the NAND gate 106 receives the data signal D. The NAND gate 108 receives the enable signal ENBL and the signal Do_2. The output of the NAND gate 108 is connected to the AND gate 110. The AND gate 110 further receives the output from the NAND gate 106. The NAND gate 106 outputs the signal Din_3 which is fed to the subcircuit 54.

The operation of the drive strength circuit 7 and the drive circuit 12 included therein will be better understood with reference to FIG. 9 (comprising FIGS. 9A–9N) which shows timing diagrams for the drive circuit 12 as a function of time. The timing diagrams include individual timing diagrams for the signals discussed above. The signals are digital signals. Transitions between the two levels of each signal occur at rising edges or falling edges. FIGS. 9A and 9B show the clock signals CLK, CLK1. FIGS. 9C–9F show the signals Din_1-Din_4. FIG. 9G shows the enable signal ENBL. FIGS. 9H–9J show the signals Do_2, Do_3, Do_4. FIGS. 9K–9M show the signals RED_1, RED_2, RED_3. FIG. 9N shows the data signal D.

Examples of the various transitions that occur in the signals are hereinafter described, wherein the relationships between transitions are indicated by means of arrows as shown in FIG. 9. The data signal D and the clock signal CLK are external signals which determine the signals within the drive circuit 12. In one embodiment, the clock signals CLK, CLK1 have a bit rate of about 40 Mbit/s, wherein the clock signal CLK1 has a delay of a few 10 nanoseconds with respect to the clock signal CLK.

Figures 9A, 9B:
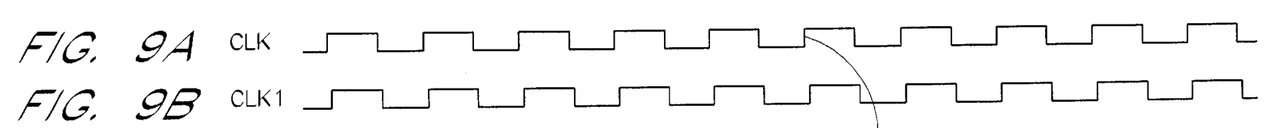
FIGS. 9A–9N show a timing diagram for the drive strength circuit.
Figures 9C, 9D, 9E, 9F:
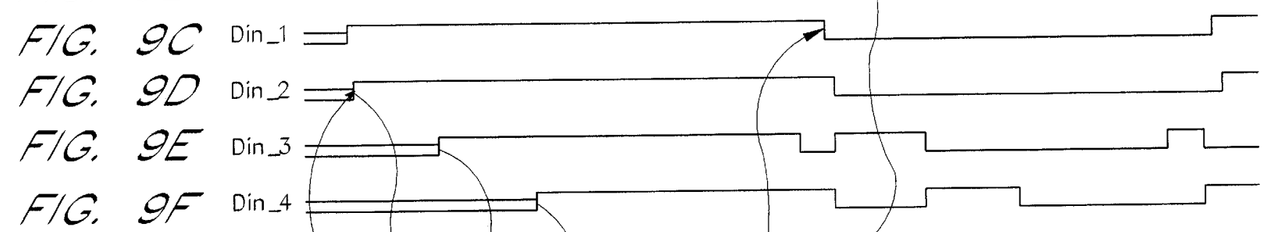
Figures 9G, 9H:
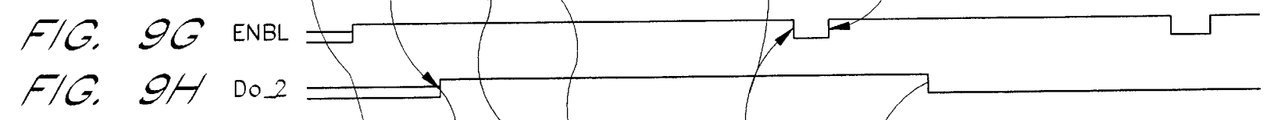
Figures 9I, 9J, 9K:
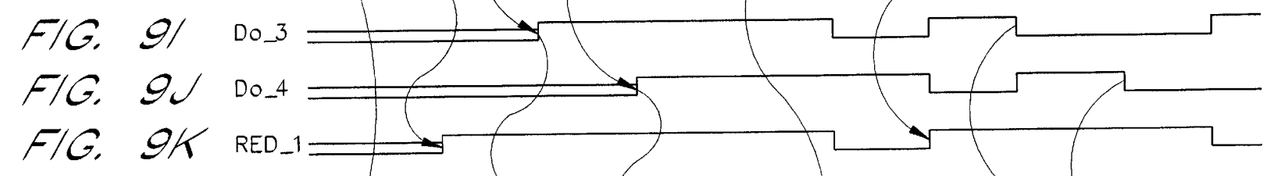
Figures 9L, 9M, 9N:
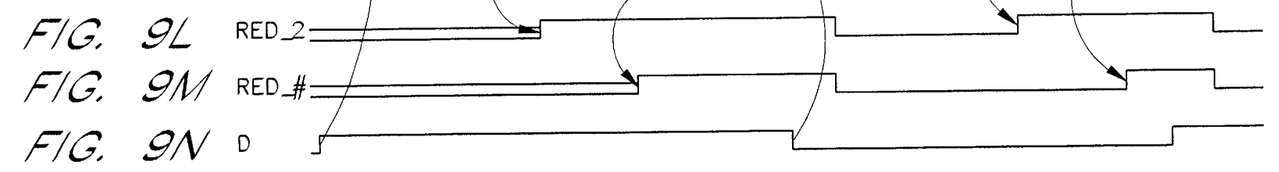

As shown in FIG. 9N, the data signal D is set to a logic HIGH (t=T1), reset to a logic LOW (t=T5) and again set to a logic HIGH (t=T1.) The signal D is input to the flip-flop 70. At the next rising edge of the clock signal CLK (FIG. 9B), the output of the flip-flop 70 is set to a logic HIGH generating the signal Din_1 (FIG. 9C) and the enable signal ENBL (FIG. 9G). With the signal Din_1 set to a logic HIGH, the signal Din_2 changes to a logic HIGH (FIG. 9), and one clock cycle later the signal Din_3 is set to a logic HIGH at a rising edge of the clock signal CLK (FIG. 9E.) One clock cycle after the signal Din_3 is set to a logic HIGH, the signal Din_4 is set to a logic HIGH at a rising edge of the clock signal CLK (FIG. 9F.) When the data signal D returns to a logic LOW (t=T5), at the subsequent rising edge of the clock signal CLK the signals Din_1, Din_2, Din_4 return to a logic LOW. The signal Din_3, however, returns to logic LOW when the enable signal ENBL returns to logic LOW.

The signal Do_2 is set to a logic HIGH one clock cycle (t=T2) after the signal Din_2 is set to a logic HIGH (FIG. 9H.) Thus, at t=T2, the rising edge of the signal Do_2 sets the signal RED_1 to a logic HIGH (FIG. 9K.) The signal Do_3 is set to a logic HIGH one clock cycle (t=T3) after the signal Din_3 is set to a logic HIGH (FIG. 9I.) Thus, at t=T3, the rising edge of the signal Do_3 sets the signal RED_2 to a logic HIGH (FIG. 9L.) Similarly, the signal Do_4 is set to a logic HIGH one clock cycle (t=T4) after the signal Din_4 is set to logic HIGH (FIG. 9J.) Thus, at t=T4, the rising edge of the signal Do_4 sets the signal RED_3 to a logic HIGH (FIG. 9M.) Therefore, at t=T4, all signals RED_1, RED_2, RED_3 are set to a logic HIGH.

In the illustrated embodiment, the data signal D returns to a logic LOW at t=T5. The falling edge of the data signal D causes the enable signal ENBL and the signal Din_1 to return to a logic LOW. The enable signal ENBL at a logic LOW sets the signals RED_1, RED_2, RED_3 back to a logic LOW. Therefore, at t=T6, all signals RED_1, RED_2, RED_3 are reset to a logic LOW. It should be understood that if the data signal D remained high for additional clock cycles, the enable signal ENBL would not return to a logic LOW until after the data signal D went low, thus delaying the resetting of the RED_1, RED_2 and RED_3 signals.

The data signal D is now LOW. At the next rising edge of the clock signal CLK, however, the enable signal ENBL returns to a logic HIGH so that the drive circuit 12 is again enabled. Thereafter, the signals RED_1, RED_2, RED_3 are sequentially set to logic HIGH (t=T7, T8, T9) as described above and simultaneously reset (t=T 11) when the data signal D returns (t=T 10) to a logic HIGH. Thus, it can be seen that the drive strength circuit 7 operates to reduce the drive strength when the data signal D remains at either the logic HIGH or the logic LOW state for more than one clock cycle.

Although this invention has been described in terms of certain preferred embodiments, other embodiments that are apparent to those of ordinary skill in the art are also within the scope of this invention. Accordingly, the scope of the invention is intended to be defined by the claims that follow.

What is claimed is:

1. A transceiver circuit for transmitting a data signal having first and second logic levels over a communications bus at a predefined bit rate, comprising:
 a transmitter configured to receive and modify the data signal and to feed the modified data signal to the communications bus, the transmitter comprising:
  a drive circuit configured to receive the data signal and a clock signal, and to generate at least first and second control signals which depend on the logic level of the data signal, the first and second control signals being sequentially generated when the data signal has consecutive bits of the same logic level; and
  an output circuit configured to receive the at least first and second control signals and the data signal and to generate an output signal having a logic level responsive to the data signal, where the output circuit decreases a drive strength in response to said first control signal and further decreases the drive strength in response to the second drive signal while maintaining said logic level of said output signal.

2. The transceiver circuit of claim 1, wherein the drive circuit generates three control signals.

3. The transceiver circuit of claim 2, wherein the output signal is a differential signal having a noninverted and an inverted signal portion, and wherein the output circuit includes a first transistor circuit outputting the noninverted signal portion and a second transistor circuit outputting the inverted signal portion.

4. The transceiver circuit of claim 3, further comprising logic gates interconnected between the drive circuit and the first and second transistor circuits, the logic gates activating the transistor circuits as a function of the data signal and the control signals.

5. A transceiver circuit for transmitting a data signal having first and second logic levels over a communications bus at a predefined bit rate, comprising:
 a transmitter configured to receive and modify the data signal and to feed the modified data signal to the communications bus, the transmitter comprising:
  a drive circuit configured to receive the data signal and a clock signal, and to generate three control signals which depend on the logic level of the data signal, the three control signals being sequentially generated when the data signal has consecutive bits of the same logic level;
  an output circuit configured to receive the three control signals and the data signal, and to generate an output signal which corresponds to the data signal and has a varying drive strength determined by said three control signals, and where the output signal is a differential signal having a noninverted and an inverted signal portion, and where the output circuit includes a first transistor circuit outputting the non-inverted signal portion and a second transistor circuit outputting the inverted signal portion, wherein:
   the first transistor circuit has a first input for the data signal, second inputs for first status signals and third inputs for inverted first status signals, the first status signals depending from the control signals and the data signal, and the inverted first status signals depending from the control signals and the inverted data signal; and
   the second transistor circuit has a fourth input for an inverted data signal, fifth inputs for second status signals and sixth inputs for inverted second status signals, the second status signals depending from the control signals and the inverted data signal, and the inverted second status signals depending from the control signals and the data signal; and
  logic gates interconnected between the drive circuit and the first and the second transistor circuits, the logic gates activating the first and the second transistor circuits as a function of the data signal and the control signals.

6. The transceiver circuit of claim 1, wherein:
 the output circuit comprises pairs of complementary transistors, the pairs arranged in parallel with respect to ground and a supply voltage, with connections between a first and second transistor of each pair connected to an output of the output circuit; and the first and second transistor of a first pair receive the data signal.

7. A bus driver interface module for transmitting a data signal having first and second logic levels over a communications bus at a predefined bit rate, comprising:

a transmitter configured to receive and modify the data signal and to feed the modified data signal to the communications bus, the transmitter comprising:

a drive circuit configured to receive the data signal and a clock signal, where the clock signal is related to the bit rate, where the drive circuit is further configured to generate at least one control signal which depends on the logic level of the data signal, and where the at least one control signal is generated when the data signal has consecutive bits of the same logic level; and an output circuit configured to receive the at least one control signal and the data signal and further configured to generate an output signal having a logic level responsive to the data signal, where the output circuit decreases a drive strength in response to said at least one control signal while maintaining said logic level of said output signal.

8. The bus driver of claim 7, wherein the drive circuit generates three control signals.

9. The bus driver of claim 8, wherein the output signal is a differential signal having a noninverted and an inverted signal portion, and wherein the output circuit includes a first transistor circuit outputting the noninverted signal portion and a second transistor circuit outputting the inverted signal portion.

10. The bus driver of claim 9, further comprising logic gates interconnected between the drive circuit and the first and second transistor circuits, the logic gates activating the transistor circuits as a function of the data signal and the control signals.

11. A bus driver interface module for transmitting a data signal having first and second logic levels over a communications bus at a predefined bit rate, comprising:

a transmitter configured to receive and modify the data signal and to feed the modified data signal to the communications bus, the transmitter comprising:

a drive circuit configured to receive the data signal and a clock signal, and to generate three control signals which depend on the logic level of the data signal, the three control signals being sequentially generated when the data signal has consecutive bits of the same logic level;

an output circuit configured to receive the three control signals and the data signal and configured to generate an output signal which corresponds to the data signal and has a varying drive strength determined by the three control signals, where the output signal is a differential signal having a noninverted and an inverted signal portion, and where the output circuit includes a first transistor circuit outputting the noninverted signal portion and a second transistor circuit outputting the inverted signal portion, wherein:

the first transistor circuit has a first input for the data signal, second inputs for first status signals and third inputs for inverted first status signals, the first status signals depending from the control signals and the data signal and the inverted first status signals depending from the control signals and the inverted data signal; and the second transistor circuit has a fourth input for an inverted data signal, fifth inputs for second status signals and sixth inputs for inverted second status signals, the second status signals depending from the control signals and the inverted data signal, and the inverted second status signals depending from the control signals and the data signal; and logic gates interconnected between the drive circuit and the first and second transistor circuits, the logic gates activating the transistor circuits as a function of the data signal and the control signals.

12. The bus driver of claim 7, wherein:

the output circuit comprises pairs of complementary transistors, the pairs arranged in parallel with respect to ground and a supply voltage, with connections between a first and second transistor of each pair connected to an output of the output circuit; and the first and second transistor of a first pair receive the data signal.

13. A circuit for transmitting a data signal, comprising:

a drive circuit configured to receive a data signal having first and second logic levels, and to generate a plurality of control signals which depend on the logic level of the data signal, the control signals being sequentially generated when the data signal has consecutive bits of the same logic level; and an output circuit configured to receive the control signals and the data signal, where the output circuit is further configured to generate an output signal having a logic level which is responsive to the data signal, said output circuit generating said output signal with a drive strength having an initial magnitude, said output circuit operating to decrease said drive strength in response to said plurality of sequentially generated control signals while maintaining said output signal at said logic level.

14. The circuit of claim 13, wherein the drive circuit is further configured to receive a clock signal.

15. The circuit of claim 13, wherein the drive circuit generates three control signals.

16. The circuit of claim 15, wherein the output signal is a differential signal having a noninverted and an inverted signal portion, and wherein the output circuit includes a first transistor circuit outputting the noninverted signal portion and a second transistor circuit outputting the inverted signal portion.

17. The circuit of claim 16, further comprising logic gates interconnected between the drive circuit and the first and second transistor circuits, the logic gates activating the transistor circuits as a function of the data signal and the control signals.

18. A circuit for transmitting a data signal, comprising:

a drive circuit configured to receive a data signal having first and second logic levels, and to generate three control signals which depend on the logic level of the data signal, the three control signals being sequentially generated when the data signal has consecutive bits of the same logic level;

an output circuit configured to receive the three control signals and the data signal and configured to generate an output signal which corresponds to the data signal, where the output signal has a varying drive strength determined by the three control signals, and where the output signal is a differential signal having a noninverted and an inverted signal portion, and wherein the output circuit includes a first transistor circuit outputting the noninverted signal portion and a second transistor circuit outputting the inverted signal portion, wherein:

the first transistor circuit has a first input for the data signal, second inputs for first status signals and third inputs for inverted first status signals, the first status signals depending from the control signals and the data signal, and the inverted first status signals depending from the control signals and the inverted data signal; and the second transistor circuit has a fourth input for an inverted data signal, fifth inputs for second status signals and sixth inputs for inverted second status signals, the second status signals depending from the control signals and the inverted data signal, and the inverted second status signals depending from the control signals and the data signal; and logic gates interconnected between the drive circuit and the first and second transistor circuits, the logic gates activating the transistor circuits as a function of the data signal and the control signals.

19. The circuit of claim 13, wherein:

the output circuit comprises pairs of complementary transistors, the pairs arranged in parallel with respect to ground and a supply voltage, with connections between a first and second transistor of each pair connected to an output of the output circuit; and the first and second transistor of a first pair receive the data signal.

20. A method for driving a communications bus with a drive strength which is determined by a data signal having first and second logic levels, comprising the steps of:

applying the data signal to a drive circuit and sequentially generating a plurality of control signals when the data signal has consecutive bits of the same logic level;

applying the data signal and the plurality of sequentially generated control signals to an output circuit; and generating an output signal which has a logic level responsive to the data signal, said output signal being driven with a variable drive strength, where the variable drive strength that drives the output signal decreases in response to at least one of the plurality of sequentially generated control signals while the output signal is maintained at the logic level responsive to the data signal.

21. The method of claim 20, wherein the step of sequentially generating control signals includes:

generating a first control signal when the data signal has two consecutive bits of the same logic level;

generating a second control signal when the data signal has three consecutive bits of the same logic level; and generating a third control signal when the data signal has four consecutive bits of the same logic level.

22. The method of claim 21, further comprising the step of resetting the control signals when the data signal changes the logic level.

23. The method of claim 21, wherein the step of generating the output signal includes driving the communications bus with a maximal drive strength following a change of a logic level of the data signal and sequentially reducing the drive strength when the data signal has consecutive bits of the same logic level.

* * * * *